Figure 1:
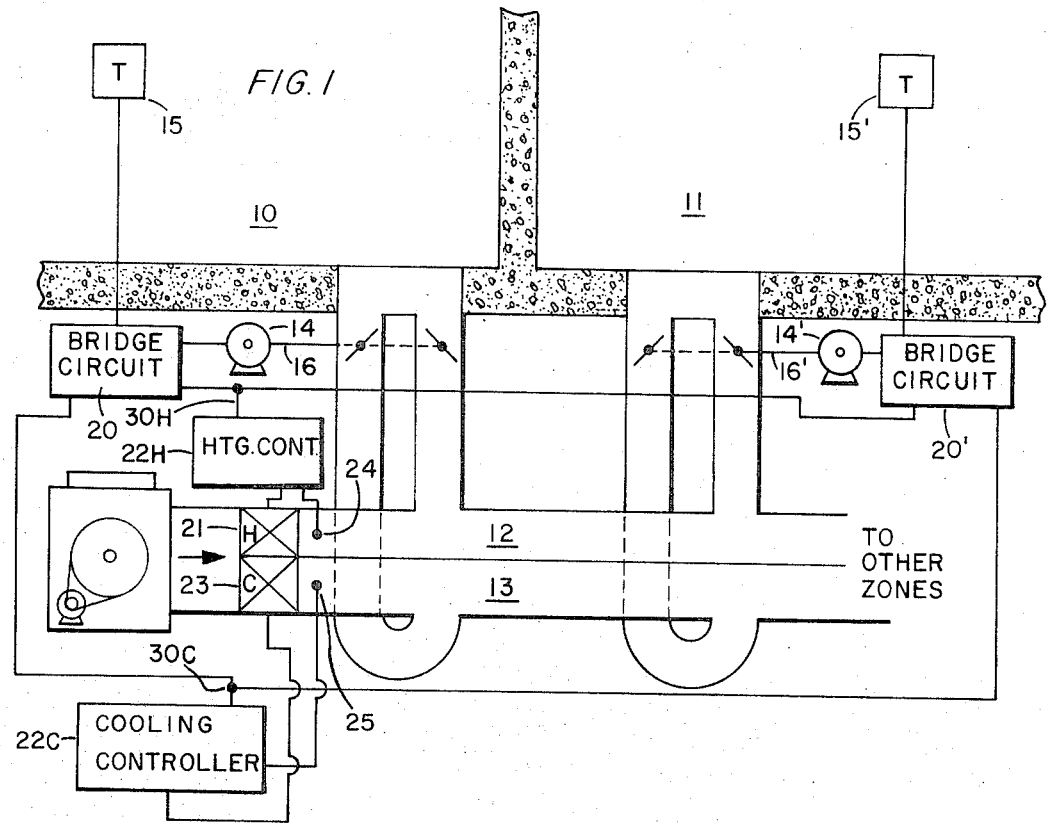

United States Patent [19]
Kabat et al.

[11] 3,785,432
[45] Jan. 15, 1974

[54] ELECTRONIC CONTROL CIRCUIT WITH TIME DELAY OF MAIN AND FEEDBACK SIGNALS

[75] Inventors: John L. Kabat, Bloomington; John L. Magnussen, New Prague; Richard B. Porter, Bloomington; James R. Tobias, Columbia Heights, all of Minn.

[73] Assignee: Honeywell Inc., Minneapolis, Minn.

[22] Filed: Oct. 2, 1972

[21] Appl. No.: 294,418

[52] U.S. Cl.............. 165/22, 236/1 C, 236/46, 236/78, 330/103
[51] Int. Cl............... F24f 3/08, H03f 1/34
[58] Field of Search............... 165/26, 22; 236/46 B, 78, 1 C; 330/103

[56] References Cited
UNITED STATES PATENTS
3,197,711  7/1965  Richardson............... 330/103
3,567,115  12/1970  Nelson................... 165/22 X Primary Examiner—William E. Wayner
Attorney—Lamont B. Koontz et al.

[57] ABSTRACT

An electronic control circuit particularly adaptable for use in a heating and/or cooling control system wherein signals are received from a plurality of zones to control stages of temperature conditioning apparatus. The control circuit has a first time delay circuit for receiving a signal indicative of the need of the energization of temperature conditioning apparatus and a second time delay circuit connected to the output of the first time delay circuit for providing a signal to a control apparatus adapted to control the temperature conditioning apparatus. A first feedback circuit is connected to the input of the second time delay circuit for providing a feedback signal indicative of the operation of the control apparatus and a second feedback circuit provides a feedback signal to the second time delay circuit indicative of the operation of the temperature conditioning apparatus.

7 Claims, 4 Drawing Figures

3,785,432

ELECTRONIC CONTROL CIRCUIT WITH TIME DELAY OF MAIN AND FEEDBACK SIGNALS

BACKGROUND AND SUMMARY OF THE INVENTION

In zone control systems such as the system disclosed in the United States patents to Elmer A. Carlson U.S. Pat. No. 3,206,120 issued Sept. 14, 1965, to Bernard K. Betz U.S. Pat. No. 3,482,623 issued Dec. 9, 1969, to Lorne W. Nelson U.S. Pat. No. 3,567,115 issued Dec. 7, 1970, and Joseph E. Hogel U.S. Pat. No. 3,568,760 issued Mar. 9, 1971, the need for stability in the control circuitry has been recognized. In many prior art electronic control systems the use of feedback circuits for stability have been used; however, with such feedback signals the speed at which these feeback signals take effect also is a factor in the stability of the control circuit. In the mentioned Carlson patent a time delay in the feedback signal is accomplished by the time required for a heater to affect the thermostat. In other prior art electronic control circuits a time delay is interposed in the individual feedback circuits to provide stability.

The present invention is concerned with an electronic control circuit providing two types of feedback signals and time delay for both a main input signal to the control circuit as well as the feedback signals with a minimum amount of electronic components to reduce the cost of the control circuit and still maintain a high degree of stability. Specifically, the main input signal to the control circuit passes through a first time delay circuit and then on to a second time delay circuit to provide the total amount of time delay necessary for the main input signal. The two feedback signals, a first indicative of the operation of the main control circuit and a second indicative of the operation of the temperature conditioning apparatus are fed into the second time delay circuit to modify the effect of the main input signal.

Figure 2:
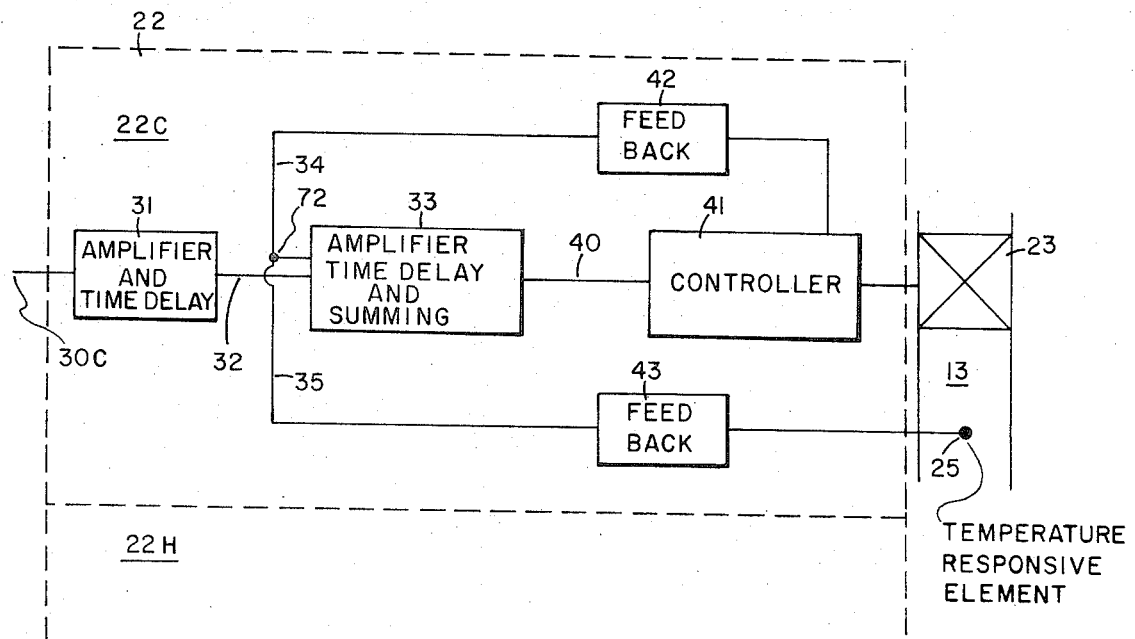
Figure 3:
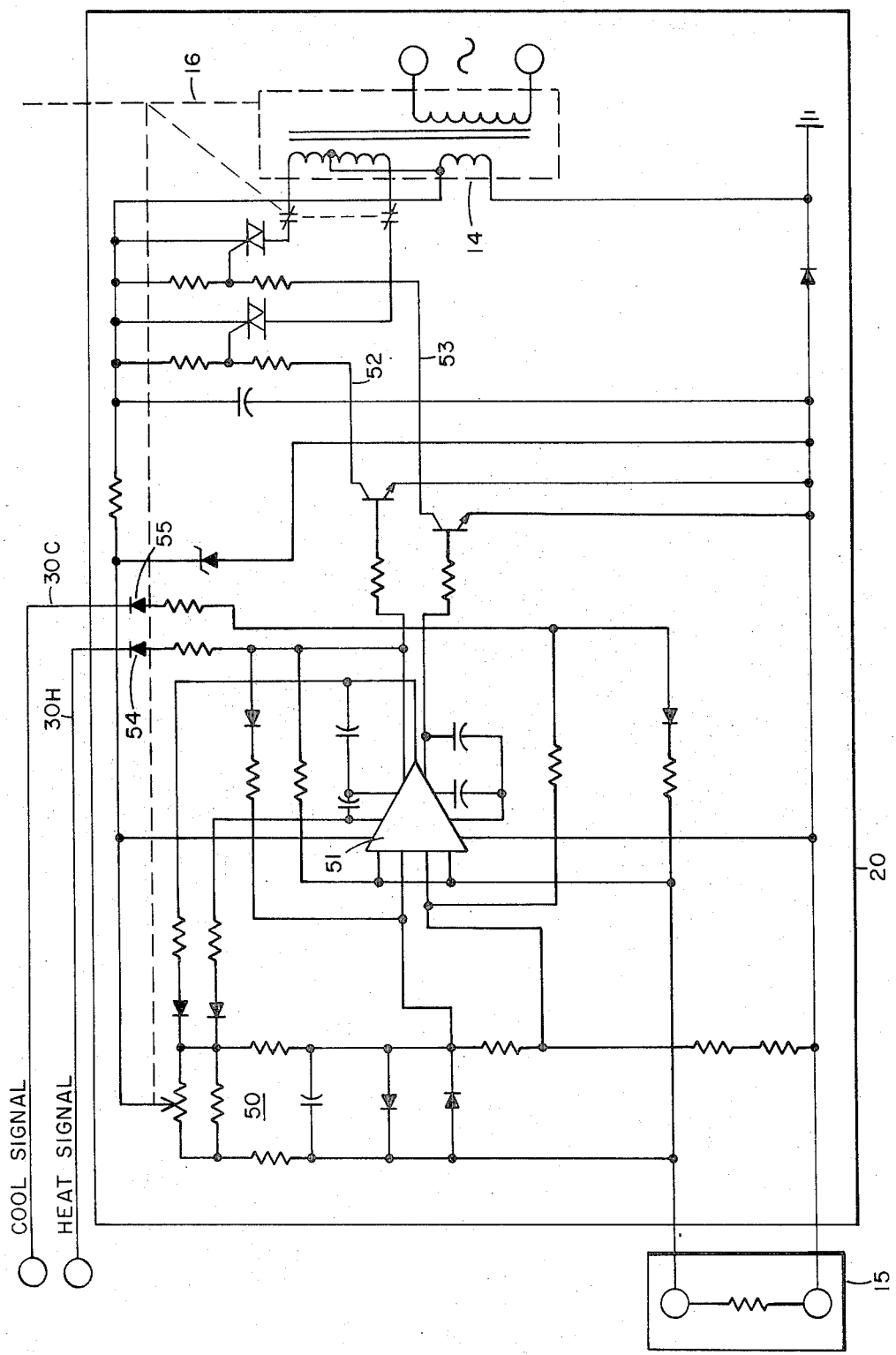
Figure 4:
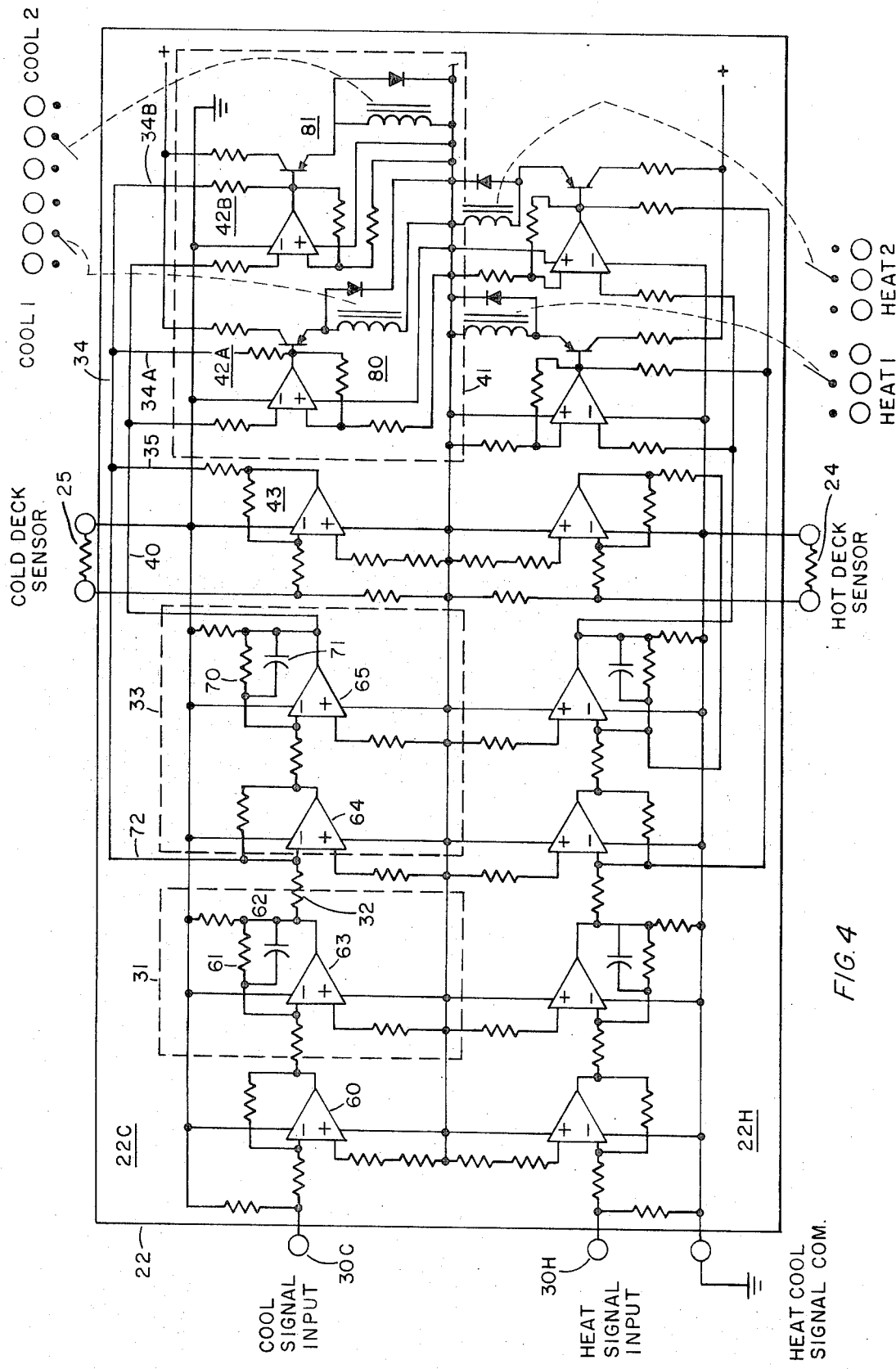

FIG. 1 is a schematic showing of a multi-zone temperature control system making use of the electronic control circuit, FIG. 2 is a block diagram of the main control circuit, FIG. 3 is a circuit diagram of the zone bridge control circuit for providing the main control circuit input signal and the control of the zone damper, and FIG. 4 is a circuit diagram of the main control circuit shown in FIG. 2.

DESCRIPTION OF THE INVENTION

Referring to FIG. 1 a zone control system is shown for controlling the temperature in zones or spaces 10 and 11 by apparatus such as that shown in the Lorne W. Nelson patent. Conditioned air is supplied from a hot deck or duct 12 and a cold deck or duct 13 to each of the zones by an amount depending upon the position of the zone dampers controlled by the zone damper motors 14 and 14' through linkages or output connections 16 and 16'. Thermostats 15 and 15' respond to the temperatures of the zones and by means of zone bridge control circuits 20 and 20', the positions of the zone damper motors are selected to supply the correct amount of air to the zones from either the hot or cold deck.

Associated with temperature conditioning apparatus or heat or cooling apparatus is a main control network circuit or central processor 22. Heat source or heat exchanger 21 is controlled by a main heating control network circuit 22H and a cooling source or heat exchanger 23 is controlled by a main cooling control network circuit 22C. An output from each of control circuits 20 and 20' is connected to a main input of control circuits 22H and 22C. In addition to the control of damper motor 14 by zone thermostat 15, the control of the outputs of the temperature conditioning sources 21 and 23 are controlled in a manner as broadly disclosed in the Joseph E. Hogel patent. The zone thermostat first controls the damper to increase the flow of air to the zone until the damper is wide open and then the zone thermostat readjusts the deck temperature by increasing the output of either the heating or cooling conditioning apparatus 21 and/or 23. Associated with each of the main control circuits 22H and 22C is a deck sensor or temperature responsive element 24 and 25 for providing a signal indicative of the temperature of the air in the hot and cold decks 12 and 13. The number of zones is not limited to the number shown, as two zones were selected for explanation purposes only.

Referring to FIG. 2 a block schematic diagram of the cooling portion 22C of the control circuit 22 is shown. A main input signal is received at input 30C which is indicative of the temperature conditioning load of the zone having the greatest load. The input signal is fed into an amplifier and first time delay network circuit 31 which has an output at 32 connected to an amplifier and time delay network circuit 33 for not only receiving the main input signal through circuit connection 32 but for summing signals on circuit connection 72. The output at 40 of network circuit 33 is connected to a temperature conditioning control apparatus, main control circuit or controller 41 for controlling the output of the temperature conditioning apparatus or heat exchanger 23 in the cold deck 13.

A feedback circuit 42 is connected to apparatus 41 for providing a negative feedback signal to the input 34 indicative of the operation of temperature conditioning control apparatus 41 to reduce the effect of said main input signal by counteracting the main signal. A second feedback circuit 43 is connected to deck temperature responsive element 25 to provide a negative feedback signal to input 35 indicative of the temperature of the air in deck 13 which is the function of the operation of the temperature conditioning apparatus 23 to reduce the effect of said main input signal. Specifically reviewing the control circuit of FIG. 2. Upon a change in level of the main signal received at input 30C, the change is delayed through first time delay circuit 31 and second time delay circuit 33 for its effect upon a change in the operation of control apparatus 41 which changes the output of the temperature conditioning apparatus 21. The change in the operation of control apparatus 41 produces a signal which is fed-back through circuit 42 and summed with the main signal but delayed by the second time delay circuit 33. Similarly, any change in the output of the temperature responsive element 25 brings about a change in the operation of apparatus 41 after a time delay caused by circuit 33. With the control circuit 22C, a first total time delay for the main signal is accomplished by the first and second time delay circuits 31 and 33. The effect of the change in the signal of the temperature responsive element 25 connected to the input 35 through the feedback circuit 43 and the operation of apparatus 41 connected through feedback circuit 42 are summed with the main signal circuit and delayed by time delay circuit 33. With the common use of the second time delay circuit 33 for both the main signal and the feedback signals a smaller number of components resulting in a more economical control circuit results as will be seen in a more specific description of the circuit shown in FIG. 4.

Referring to FIG. 3 the control circuit 20 which is used for each zone is shown in detail. A temperature responsive resistance element or thermostat 15 is connected in a rebalanced bridge circuit 50 of the type disclosed in the U.S. application of B. Hubert Pinckaers, Ser. No. 273,245 filed July 19, 1972. Circuit 50 is connected to the input of an amplifier unit 51 providing an output signal through circuits 52 and 53 to control the energization of damper motor 14. The damper motor output connection 16 is also connected to the rebalance potentiometer in the bridge circuit 50 to rebalance the bridge upon any change in the resistance of thermostat 15 to provide a position control of damper motor 14 for every temperature of the thermostat in a first range of temperatures.

Upon the temperature of thermostat 15 exceeding the first range, the rebalance potentiometer of the bridge circuit can no longer rebalance bridge 50 and a bridge output after being amplified by amplifier 51 provides a heating signal or cooling signal over circuits 30H and 30C having a magnitude depending upon the temperature at the thermostat in the second range of temperatures. As mentioned each zone contains a zone circuit 21. Contained in the circuits 30H and 30C are diodes 54 and 55 which when back biased prevents the signal of amplifier 51 from passing through the diodes. Circuit 20 of the zone having the largest load demand or heat signal or cool signal over circuits 30H and 30C selectively passes a signal through the diodes to the input of the control circuit 22 to either control the heating or cooling apparatus.

Referring to FIG. 4 the specific circuit of the control circuit 22 is shown which when described in the block diagram of FIG. 2 had a cooling portion 22C and a heating portion 22H. Since the two portions are identical for all practical purposes only the cooling portion 22C will be described in any detail. The main cooling signal of circuit 30C is connected into a first amplifier unit 60 which has its output connected to the input of the amplifier and time delay circuit 31. Specifically the time delay is accomplished by a resistance 61 and a capacitor 62 connected in parallel between the output and input of the amplifier unit 63. Amplifier unit 63, as well as other amplifiers to be mentioned, is an integrated circuit chip of a conventional type available from electrical suppliers such as an MC3301P unit available from Motorola Semiconductor Products Inc. The output of circuit 31 is connected by connection 32 to an amplifier, time delay and summing circuit 33 which is made up of an ampiifier 64 and amplifier 65. A resistance 70 and a capacitor 71 are connected between the output and input of amplifier 65 to provide the time delay. Also connected to circuit 33 is the feedback signals over a circuit 72 which has the feedback output on circuit 35 from circuit 43 of the cold deck temperature responsive element 25 and the feedback output circuit 34 made up of signals over 34A and 34B which are brought about by the operation of the two stages (cool 1 and 2) of controller 41.

The output of the second time delay circuit 33 is connected to the input 40 of control circuit 41 which brings about the energization of a first relay 80 and a second relay 81 in a sequential staging manner to operate two stages of conventional cooling apparatus associated with the cooling changing apparatus 23 depending upon the level of the main input signal received from the thermostat of the zone having the greatest cooling load.

OPERATION OF THE INVENTION

Upon a call for cooling thermostat 15 of zone 10 as shown in FIG. 1, a first range of increase in the zone temperature causes the zone damper motor to open the damper to allow more air to flow from cold deck 13 and less air to flow from hot deck 12. If the zone temperature continues to increase above the first range of temperature, the thermostat causes a main cooling signal to be developed in circuit 20 as shown in FIG. 3 to provide the main cooling output signal over circuit 30C to cooling control circuit 22C which is shown in block diagram in FIG. 2. As the main cooling control signal over circuit 30C increases, an increase in the output of the temperature conditioning apparatus 23 results by the sequential operation of the stages (cool 1 and 2) of cooling apparatus to cool the air passing through duct 13.

In order to maintain stability in such a control system, any change in the main control signal over input 30C is delayed to prevent a sudden reaction by the control apparatus 41. Specifically the change of the input signal can take place if a change in the setpoint of the thermostat 15 was brought about by a manual adjustment of the thermostat over a wide range in temperature or electrical noise pick up in the electrical circuit. The time delay interposed in the effect of the main signal over circuit 30C on the apparatus 41 is brought about by the total time delay produced by circuits 31 and 33.

The feedback from the condition control apparatus 41 and the temperature responsive element 25 are summed and connected into the second time delay circuit 33 to make use of the same time delay network which is used with the main signal. Both of the feedback signals and the main signal over circuit 32 are summed by means of a single amplifier network 33 which also provides additional time delay for the main signal and time delay to slow the effects of the feedback signals and add stability to the control circuit. With the use of the single circuit 33 to provide the amplification time delay and summing, the control circuit operation is accomplished with a fewer number of components to reduce the cost of the apparatus.

Specifically, with a steady load condition in zone 10 causing at input 30C from zone thermostat 15, the combined feedbacks of circuits 42 and 43 result in a predetermined cycling rate of controller 41. These feedbacks result from the operation of at least one stage of controller 41 and some predetermined reduction of the deck air temperature at 25 due to the effect of heat exchanger 23. Assuming that a change in the load condition of zone 11 takes place to reduce air flow in deck 13, a sudden drop in the deck air temperature at element 25 takes place. The drop in temperature increases the feedback signal of circuit 43 to reduce the effect of the main signal on controller 41 to increase the cycling rate of controller 41. With an increase in the cycling rate, the feedback signal of circuit 42, in combination with time delay 33, decreases resulting in a lessing of the increase in cycling rate of controller 41 which is desirable to lengthen equipment life. The specific operation is similar for the heating circuit 22H and is then even more important as deck temperature in the heating apparatus tends to change more rapidly upon a reduction of air flow in the deck 12 especially when electric heating is used at heat source 21.

The embodiments of the invention in which an exclusive property or right is claimed are defined as follows:

1. In a zone control system having a zone damper motor for each zone for controlling the supply of hot and cold air to the zone in response to a zone thermostat connected thereto by a control circuit having heating and cooling control output circuits with signals indicative of the temperature of the air needed for that zone for heating and cooling and having a central processor to which the output circuits are connected so the zone of the highest demand controls heating and cooling apparatus furnishing the supply of hot and cold air, the improvement comprising:
    a control circuit in the central processor comprising an input circuit selectively connected to one of said output circuits for receiving a signal indicative of the temperature conditioning load of the zone having the greatest temperature conditioning load,
    a first time delay circuit connected to said input circuit to receive aaid input signal for delaying any changes in said input signal by a first predetermined amount,
    a second time delay circuit connected to receive an output of said first time delay circuit,
    control means adapted to control temperature conditioning apparatus in response to an output of said second time delay circuit,
    a first feedback signal circuit from said control means for providing a feedback signal indicative of the operation of said control means,
    a second feedback signal circuit adapted to respond to a condition indicative of the operation of the temperature conditioning apparatus for providing a feedback signal, and
    circuit means connecting said first and second feedback signal to said second time delay circuit.

2. In a control circuit adapted for receiving a main signal indicative of the need of operation of temperature conditioning apparatus and adapted to control the temperature conditioning apparatus, comprising:
    first circuit means adapted to receive the main signal, said circuit means providing a predetermined time delay between the effect of changes of the signal and changes in a first output signal of said circuit means,
    second circuit means connected to receive said first output signal, said second circuit means providing a predetermined time delay between the effects of changes of said first output signal and changes in a second output signal of said second circuit means,
    control circuit means adapted to control temperature conditioning apparatus, said control circuit being connected to respond to said second output signal,
    first feedback circuit means providing a first feedback signal to said second circuit means indicative of the operation of said control circuit means, and
    second feedback circuit means adapted to provide a second feedback signal to said second circuit means indicative of the effect of the operation of the temperature conditioning apparatus.

3. The invention of claim 1 wherein said second time delay circuit comprises a summing circuit means for receiving said input signal from said first time delay circuit, and said feedback signals from said first and second feedback circuits.

4. The invention of claim 1 wherein said control means comprises a staging control device for controlling at least two stages of temperature conditioning apparatus in sequence, said first feedback signal circuit means providing a feedback signal upon the operation of each of said two stages.

5. The invention of claim 2 wherein, said first feedback signal is a negative signal for counteracting said main signal to reduce its effect temporarily on said control circuit means, and said second feedback signal is a negative signal for counteracting said main signal to reduce its effect temporarily on said control circuit means.

6. The invention of claim 5 wherein, said control circuit is a stage control apparatus adapted for controlling at least two stages of temperature conditioning apparatus in sequence, said first feedback signal is made up of several separate signals each brought about by the operation of one of said stages of said stage control apparatus.

7. The invention of claim 6 wherein said second feedback signal circuit means comprises, circuit means adapted to respond to an output signal of a temperature responsive device responding to the temperature of air in a duct as the temperature changes upon the operation the temperature conditioning apparatus.

* * * * *